United States Patent
Kumar et al.

(10) Patent No.: US 12,526,731 B2
(45) Date of Patent: Jan. 13, 2026

(54) METHOD AND WIRELESS NETWORK TO SWITCH MULTI-USIM FEATURE IN THE WIRELESS NETWORK

(71) Applicant: SAMSUNG ELECTRONICS CO., LTD., Suwon-si (KR)

(72) Inventors: Lalith Kumar, Bangalore (IN); Danish Ehsan Hashmi, Bangalore (IN); Koustav Roy, Bangalore (IN); Arijit Sen, Bangalore (IN); Jagadeesh Gandikota, Bangalore (IN); Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 18/166,360

(22) Filed: Feb. 8, 2023

(65) Prior Publication Data

US 2023/0254762 A1   Aug. 10, 2023

(30) Foreign Application Priority Data

Feb. 8, 2022   (IN) .............................. 202241006778
Jan. 24, 2023  (IN) .............................. 202241006778

(51) Int. Cl.
*H04W 48/14* (2009.01)
*H04W 60/04* (2009.01)
*H04W 88/06* (2009.01)

(52) U.S. Cl.
CPC ........... *H04W 48/14* (2013.01); *H04W 60/04* (2013.01); *H04W 88/06* (2013.01)

(58) Field of Classification Search
CPC ..... H04W 48/18; H04W 60/00; H04W 88/06; H04W 60/005; H04W 60/04; H04W 4/90; H04W 8/183; H04W 48/14
(Continued)

(56) References Cited

U.S. PATENT DOCUMENTS

2015/0281929 A1   10/2015   Shih et al.
2016/0249408 A1   8/2016    Thiruvenkatachari et al.
(Continued)

FOREIGN PATENT DOCUMENTS

WO    2018008944 A1    1/2018
WO    2021147958 A1    7/2021

OTHER PUBLICATIONS

International Search Report and Written Opinion of the International Searching Authority dated May 24, 2023, in connection with International Application No. PCT/KR2023/001863, 7 pages.
(Continued)

*Primary Examiner* — Maria El-Zoobi

(57) ABSTRACT

The disclosure relates to a 5G or 6G communication system for supporting a higher data transmission rate. A method performed by a user equipment (UE) in a mobile communication system is provided. The method comprises receiving, from an access management function (AMF) entity via a base station, a configuration update command message in case that the UE supporting a multi universal subscriber identity module (MUSIM) feature is not registered for an emergency service, and disabling the MUSIM features based on the received configuration update command message. The configuration update command message includes registration result information indicating that the UE supporting the MUSIM features is registered for the emergency service.

12 Claims, 13 Drawing Sheets

(58) Field of Classification Search
    USPC .................................................... 455/404.1
    See application file for complete search history.

(56) References Cited

U.S. PATENT DOCUMENTS

| | | |
|---|---|---|
| 2016/0345149 A1 | 11/2016 | Chuttani et al. |
| 2017/0094501 A1 | 3/2017 | Huang-Fu et al. |
| 2019/0021064 A1 | 1/2019 | Ryu et al. |
| 2022/0053448 A1* | 2/2022 | Velev .................... H04W 76/27 |
| 2022/0240213 A1* | 7/2022 | Ly ........................ H04W 60/04 |
| 2022/0264506 A1* | 8/2022 | Kiss ..................... H04W 60/00 |
| 2022/0286993 A1* | 9/2022 | Youn ..................... H04W 8/06 |
| 2022/0330202 A1* | 10/2022 | Kumar .................. H04W 60/00 |

OTHER PUBLICATIONS

3rd Generation Partnership Project;Technical Specification Group Core Network and Terminals; Non-Access-Stratum (NAS) protocol for 5G System (5GS); Stage 3; (Release 17); 3GPP TS 24.501, V17.5.0, Jan. 2022, 916 pages.

The Extended European Search Report dated Apr. 22, 2025, in connection to European Application No. 23753155.3, 8 pages.

\* cited by examiner

METHOD AND WIRELESS NETWORK TO SWITCH MULTI-USIM FEATURE IN THE WIRELESS NETWORK

This application is based on and claims priority under 35 U.S.C. § 119 to Indian Patent Application No. 202241006778 filed on Feb. 8, 2022, Indian Patent Application No. 202241006778 filed on Jan. 24, 2023, in the Indian Intellectual Property Office, the disclosure of which are incorporated by reference herein in their entirety.

BACKGROUND

1. Field

The present disclosure relates to a wireless communication and system, more particularly to a wireless network and a method to control multi universal subscriber identity module (MUSIM) features in the wireless network during an emergency mode.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (Bandwidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

According to an embodiment, a method performed by a user equipment (UE) in a mobile communication system is provided. The method comprises receiving, from an access management function (AMF) entity via a base station, a configuration update command message in case that the UE supporting a multi universal subscriber identity module (MUSIM) feature is not registered for an emergency service, and disabling the MUSIM features based on the received configuration update command message. The configuration update command message includes registration result information indicating that the UE supporting the MUSIM features is registered for the emergency service.

A user equipment (UE) in a mobile communication system is provided. The UE comprises a transceiver and a controller coupled with the transceiver and configured to receive, from an access management function (AMF) entity via a base station, a configuration update command message in case that the UE supporting a multi universal subscriber identity module (MUSIM) feature is not registered for an emergency service, and disable the MUSIM features based on the received configuration update command message. The configuration update command message includes registration result information indicating that the UE supporting the MUSIM features is registered for the emergency service.

According to an embodiment, a method performed by an access management function (AMF) entity in a mobile communication system is provided. The method comprises transmitting, to a user equipment (UE) via a base station, a configuration update command message in case that the UE supporting a multi universal subscriber identity module (MUSIM) features is not registered for an emergency service, and disabling the MUSIM features based on the configuration update command message being transmitted to the UE. The configuration update command message includes registration result information indicating that the UE supporting the MUSIM features is registered for the emergency service.

According to an embodiment, an access management function (AMF) entity in a mobile communication system is provided. The AMF entity comprises a transceiver and a controller coupled with the transceiver and configured to transmit, to a user equipment (UE) via a base station, a configuration update command message in case that the UE supporting a multi universal subscriber identity module (MUSIM) features is not registered for an emergency service, and disable the MUSIM features based on the configuration update command message being transmitted to the UE. The configuration update command message includes registration result information indicating that the UE supporting the MUSIM features is registered for the emergency service.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The method and the wireless network are illustrated in the accompanying drawings, throughout which like reference letters indicate corresponding parts in the various figures. The embodiments herein will be better understood from the following description with reference to the drawings, in which.

DETAILED DESCRIPTION

Figure 1:
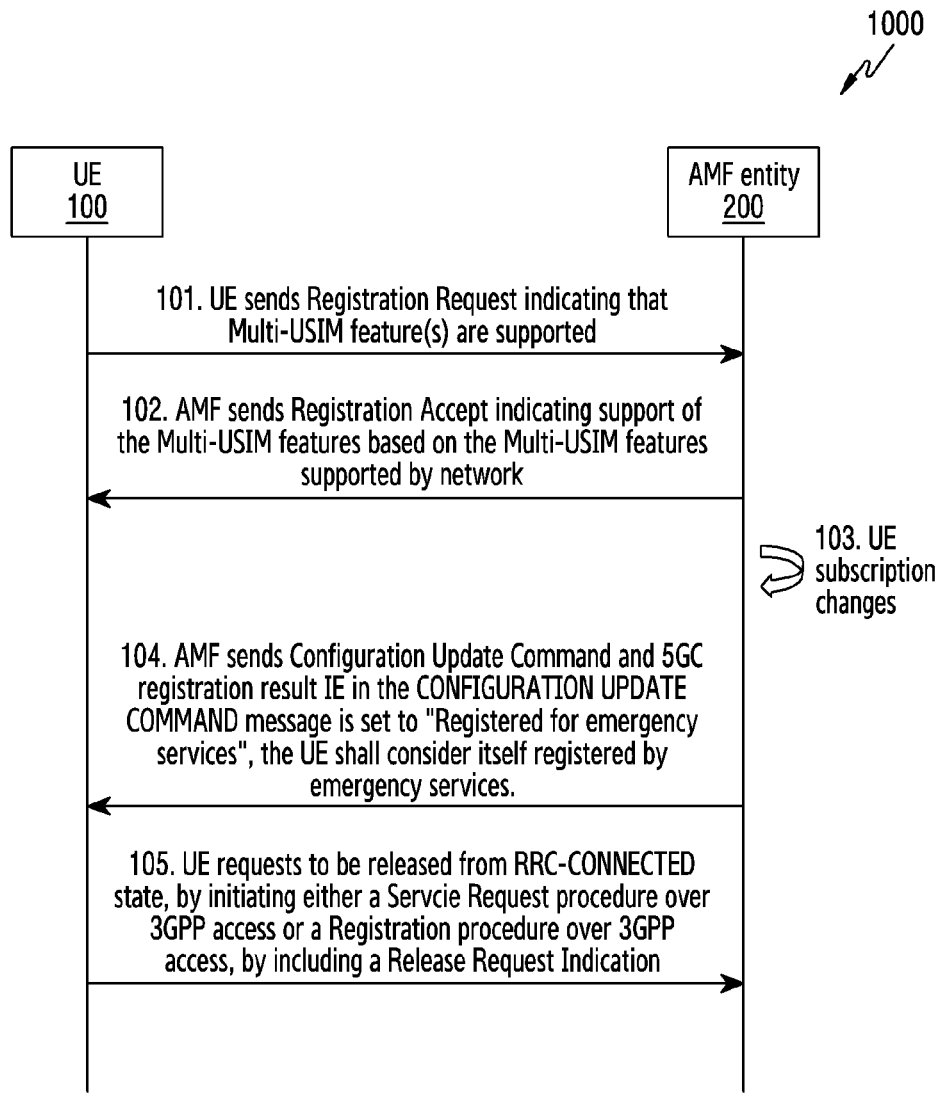
FIG. 1 illustrates a sequential flow for a scenario of a UE that sends a release request when the UE is registered for an emergency service according to an embodiment of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Some of the below abbreviations are used in the patent description:
 a) MUSIM—Multi USIM
 b) AMF—Access and Mobility Management Function
 c) CUC—Configuration Update Command
 d) SF—Session Management Function
 e) UPF—User Plane Function
 f) TAU—Tracking Area Update.
 g) IMSI—International Mobile Subscriber Identity Accordingly the embodiment herein is to provide a method to switch multi-USIM feature in a wireless network. The method includes sending, by a UE to a network apparatus in the wireless network, a registration request message indicating support for the multi-USIM feature by the UE. Further, the method includes receiving, by the UE from the network apparatus, a registration accept message indicating support of the multi-USIM feature based on the multi-USIM feature supported by the network apparatus. Further, the method includes receiving, by the UE from the network apparatus, a configuration update command message with a 5G registration result IE indicating "registered for emergency services." Further, the method includes disabling, by the UE, the multi-USIM feature.

In an embodiment, if the UE is not currently registered for emergency service and the UE receives the CONFIGURATION UPDATE COMMAND message with the 5GS registration result IE value set to "registered for emergency services," then UE may behave as if the network did not indicate support for any MUSIM feature in the last registration procedure (i.e., registration accept message). If the network apparatus has sent CONFIGURATION UPDATE COMMAND message with the 5GS registration result IE value set to "registered for emergency services," then network apparatus may behave as if the network apparatus did not indicate support for any MUSIM feature in the last registration procedure.

In the provided method, the UE disables the MUSIM features when registered for the emergency service. Further, the provided method uses an international mobile subscriber identity (IMSI) for paging occasion calculation while registered for the emergency service in an evolved packet core (EPC).

The multi-USIM UE features only apply to 3GPP access. The UE with two or more SNPN subscriptions, where one or more subscriptions may be SNPN subscriptions, can apply multi-USIM UE features when accessing SNPNs via 3GPP access. The UE may use a separate PEI for each subscription when the UE registers to the network. The number of subscriptions that can be registered with the network simultaneously is restricted by the maximum number of PEIs.

The UE and the wireless network may support one and more multi-USIM UE features (i.e., the N1 NAS signalling connection release, the paging cause, the reject paging request, the paging restriction and the paging timing collision control).

The UE supporting multi-USIM UE feature(s) may indicate support of one or more multi-USIM UE features (i.e., the N1 NAS signalling connection release, the paging cause, the reject paging request and the paging restriction) during the registration procedure for initial registration or the registration procedure for mobility registration update. The UE supporting the paging restriction indicates support of the paging restriction only when the UE has indicated support of the N1 NAS signalling connection release or the reject paging request or both.

If the UE indicates support of one or more multi-USIM UE features and the network decides to accept one or more multi-USIM UE features, the network indicates the support of one or more multi-USIM UE features during the registration procedure for initial registration or the registration procedure for mobility and periodic registration update. The network may not indicate support of any multi-USIM feature to the UE during a registration procedure for emergency services.

The UE can request the use of the N1 NAS signalling connection release, the reject paging request or the paging restriction only if the network has indicated support for the N1 NAS signalling connection release, the reject paging request or the paging restriction respectively.

The UE can request the use of the N1 NAS signalling connection release during the registration procedure for mobility registration update. The UE in a 5GMM-CONNECTED mode or in a 5GMM-CONNECTED mode with an RRC inactive indication can initiate the service request procedure to request the use of N1 NAS signalling connection release. The UE in a 5GMM-CONNECTED mode with an RRC inactive indication can initiate the service request procedure to reject the RAN paging and request the use of N1 NAS signalling connection release. The UE may not request to use N1 NAS signalling connection release if the UE is registered for emergency services or if the UE has an emergency PDU session established.

The UE in the 5GMM-IDLE mode can initiate the service procedure to reject the paging request when responding to paging rejects the paging request from the wireless network.

The UE can request the use of the paging restriction when the UE requests the use of the N1 NAS signalling connection release or the reject paging request during the registration procedure for mobility registration update or the service request procedure. The network may delete any stored paging restrictions and stop restricting paging when the UE does not include paging restriction IE in the REGISTRATION REQUEST message or SERVICE REQUEST message. If the UE requests the use of the paging restriction when the UE requests the network to release the NAS signalling connection, the network can accept or reject the paging restriction. The UE in a 5GMM-IDLE mode can initiate the service request procedure to request to remove the paging restriction.

Referring now to the drawings and more particularly to FIGS. 1 through 13, where similar reference characters denote corresponding features consistently throughout the figures, there are shown preferred embodiments.

Multi-USIM UE features only apply to 3rd generation partnership project (3GPP) access. The UE and the wireless network may support one and more multi-USIM UE features (i.e., N1 NAS signalling connection release, paging cause, reject paging request, paging restriction and paging timing collision control or the like).

The UE supporting multi-USIM UE feature(s) may indicate support of one or more multi-USIM UE features (i.e., the N1 NAS signalling connection release, the paging cause, the reject paging request and the paging restriction) during the registration procedure for initial registration or the registration procedure for mobility registration update. The UE supporting the paging restriction indicates support of the paging restriction only when the UE has indicated support of the N1 NAS signalling connection release or the reject paging request or both.

If the UE indicates support of one or more multi-USIM UE features and the wireless network decides to accept one or more multi-USIM UE features, the wireless network indicates the support of one or more multi-USIM UE features during the registration procedure for initial registration or the registration procedure for mobility and periodic registration update.

The UE can request the use of the N1 NAS signalling connection release, the reject paging request or the paging restriction only if the wireless network has indicated support for the N1 NAS signalling connection release, the reject paging request or the paging restriction respectively. Generally, a UE triggers this procedure due to some services on the alternate stack of the UE which is generally tied to alternate SIM or subscription in the ME. If a UE triggers or uses this procedure there are some unintended consequences in some situations as described in FIG. 1 and FIG. 2. Thus its desirable to solve this issues or at least provide useful alternative to solve this problem statements.

The principal object of the embodiments herein is to provide a wireless network (or system) and a method to control multi universal subscriber identity module (MUSIM) features in the wireless network during an emergency mode.

Accordingly, the embodiment herein is to provide a method to switch multi-USIM feature in a wireless network. The method includes sending, by a UE to a network apparatus e.g., AMF in the wireless network, a registration request message indicating support for the multi-USIM feature by the UE. Further, the method includes receiving, by the UE from the network apparatus, a registration accept message indicating support of the multi-USIM feature based on the multi-USIM feature supported by the network apparatus. Further, the method includes receiving, by the UE from the network apparatus, a configuration update command message with a 5G registration result information element (IE) indicating "registered for emergency services." Further, the method includes disabling, by the UE, the multi-USIM feature.

In an embodiment, the UE disables the multi-USIM feature by considering as if the network apparatus did not indicate support for any MUSIM feature in a last registration procedure i.e., as part of the registration accept message.

In an embodiment, the multi-USIM feature includes at least one of a N1 NAS signalling connection release, a paging indication for a voice service, a reject paging request, a paging restriction and a paging timing collision control, and wherein the network apparatus is an AMF entity.

In an embodiment, the network apparatus sends a configuration update command message with a 5GS registration result information element (IE) indicating "registered for emergency services" when the network apparatus deems that the UE does not receive a normal service and receives the emergency service due to change in a subscription of the UE or due to the UE being in a forbidden area.

Accordingly, the embodiment herein is to provide a method to switch multi-USIM feature in a wireless network. The method includes receiving, by a network apparatus e.g., AMF from a UE in the wireless network, a registration request message indicating support for the multi-USIM feature. Further, the method includes sending, by the network apparatus to the UE, a registration accept message indicating support of the at least one of the multi-USIM feature based on the multi-USIM feature supported by the network apparatus. Further, the method includes sending, when related triggers occurs by the network apparatus to the UE, a configuration update command message with a 5G registration result information element (IE) indicating "registered for emergency services." Further, the method includes disabling, by the network apparatus, the multi-USIM feature.

In an embodiment, the network apparatus disables the multi-USIM feature by considering as if the network apparatus did not indicate support for any MUSIM feature in a last registration procedure (i.e., registration accept message).

Accordingly, the embodiment herein is to provide a UE to switch multi-USIM feature in a wireless network. The UE includes a multi-USIM support controller communicatively coupled to a memory and a processor. The multi-USIM support controller sends a registration request message to a network apparatus in the wireless network indicating support for the multi-USIM feature by the UE. Further, the multi-USIM support controller receives a registration accept message from the network apparatus indicating support of the multi-USIM feature based on the multi-USIM feature supported by the network apparatus. Further, the multi-USIM support controller receives a configuration update command message with a 5G registration result information element (IE) indicating "registered for emergency services." Further, the multi-USIM support controller disables the multi-USIM feature.

Accordingly, the embodiment herein is to provide a network apparatus to switch multi-USIM feature in a wireless network. The network apparatus includes a multi-USIM support controller communicatively coupled to a memory and a processor. The multi-USIM support controller receives a registration request message indicating support for the multi-USIM feature by the UE. Further, the multi-USIM support controller sends a registration accept message to the UE indicating support of the at least one of the multi-USIM feature based on the multi-USIM feature supported by the network apparatus. Further, the multi-USIM support controller sends a configuration update command message to the UE with a 5G registration result information element (IE) indicating "registered for emergency services." Further, the multi-USIM support controller disables the multi-USIM feature at the network apparatus.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

FIG. 1 illustrates a sequential flow for a scenario of a UE (100) that sends a release request when the UE (100) is registered for an emergency service in a wireless network (1000), according to an embodiment of the present disclosure At step 101, the UE (100) sends the registration request indicating that the multi-USIM feature(s) are supported. At step 102, an access and mobility function (AMF) entity (200) sends the registration accept indicating support of the multi-USIM features based on the multi-USIM features supported by the wireless network. At step 103, the UE subscription changes or the UE (100) enters an area where the UE is not allowed to receive normal service for e.g., forbidden area. At step 104, the AMF entity (200) sends the configuration update command and 5GS registration result IE in the configuration update command message is set to "registered for emergency services," the UE (100) may consider itself registered for emergency services.

At step 105, the UE (100) requests to be released from an RRC-CONNECTED state, by initiating either a service request procedure over 3GPP access or a registration procedure over 3GPP access, by including a release request indication. This may result network to release the NAS signalling connection even though as important service may be ongoing for that UE.

Figure 2:
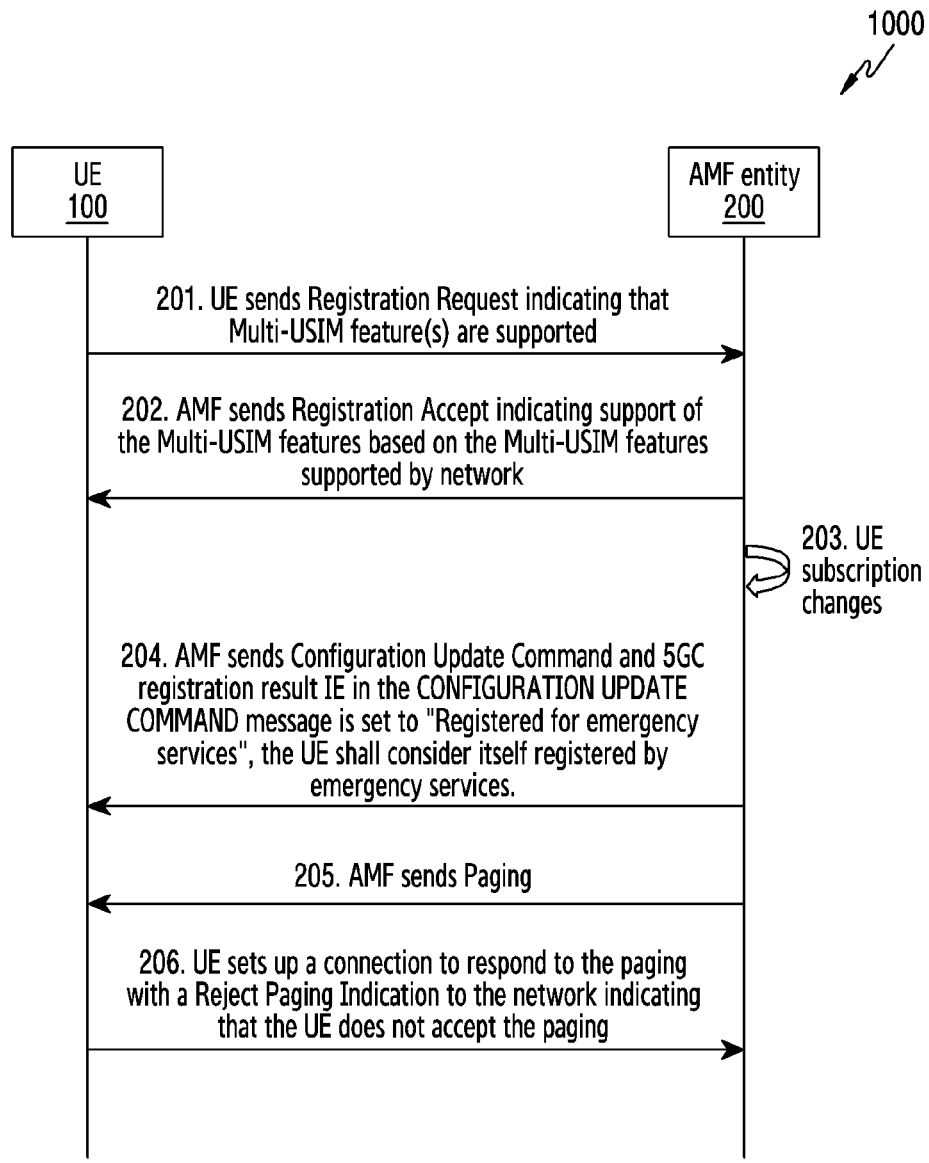
FIG. 2 illustrates a sequential flow for a scenario of the UE that rejects a paging when the UE is registered for the emergency service according to an embodiment of the present disclosure.

FIG. 2 illustrates a sequential flow for a scenario of the UE (100) that rejects paging when the UE (100) is registered for the emergency service according to an embodiment of the present disclosure.

At step 201, the UE (100) sends the registration request indicating that the multi-USIM feature(s) are supported. At step 202, the AMF entity (200) sends the registration accept indicating support of the multi-USIM features based on the multi-USIM features supported by the network. At step 203, the UE (100) subscription changes.

At step 204, The AMF entity (200) sends configuration update command and 5GS registration result IE in the CONFIGURATION UPDATE COMMAND message is set to "registered for emergency services," the UE (100) may consider itself registered for emergency services. At step 205, the AMF entity (200) sends paging. At step 206, the UE (100) sets up a connection to respond to the paging with a reject paging indication to the network indicating that the UE (100) does not accept the paging. Due to this network may not be able to establish the connection with the UE and end up dropping or delaying sending of the downlink data to the UE. This is not desirable for important services which may be ongoing in the UE.

Figure 3:
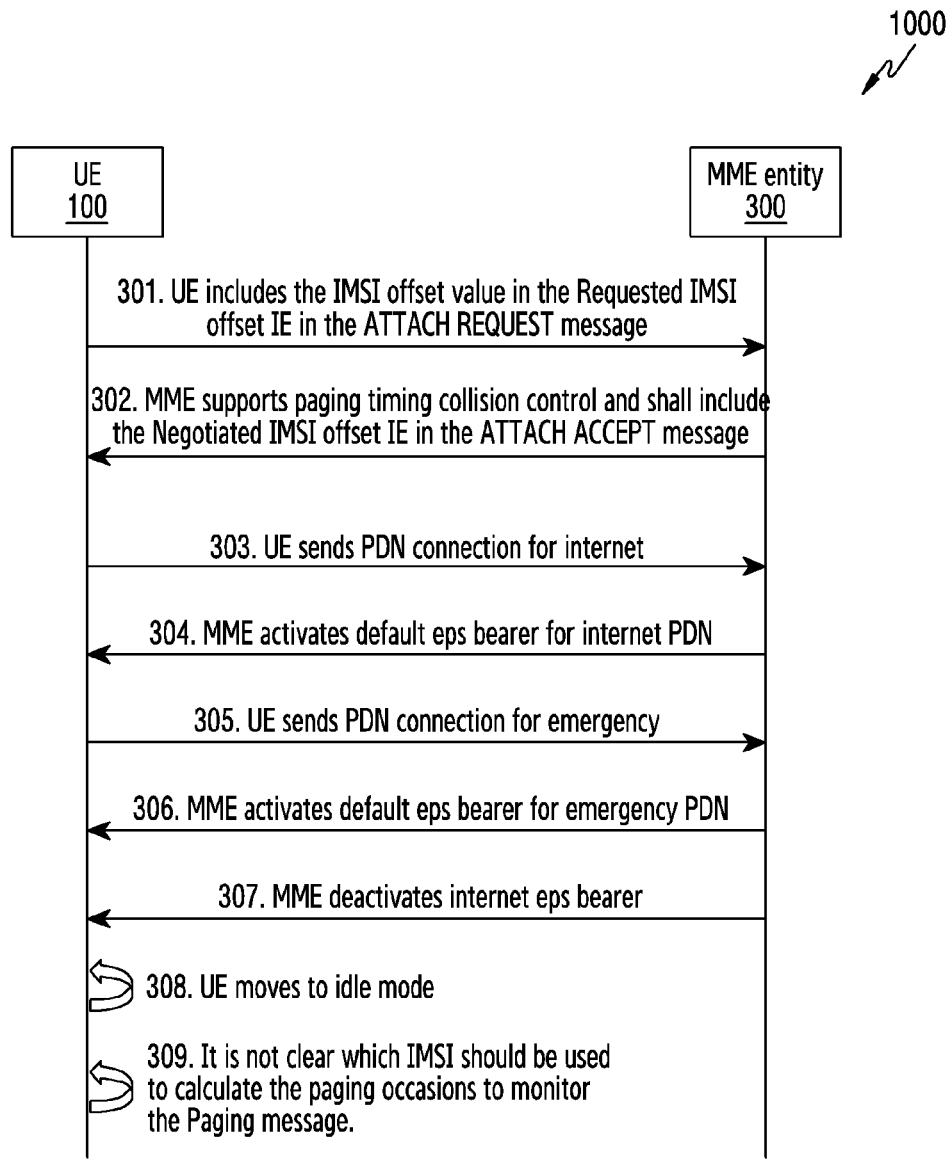
FIG. 3 illustrates a sequential flow for a scenario of paging occasion calculation while the UE is registered for the emergency service in an EPC according to an embodiment of the present disclosure.

FIG. 3 illustrates a sequential flow for a scenario of paging occasion calculation while registered for the emergency service in an EPC according to an embodiment of the present disclosure.

At step 301, the UE (100) includes the IMSI offset value in the requested IMSI offset IE in the ATTACH REQUEST message. At step 302, the MME entity (300) supports paging timing collision control and may include the negotiated IMSI offset IE in the ATTACH ACCEPT message. At step 303, the UE (100) sends the PDN connection for internet. At step 304, the MME entity (300) activates default EPS bearer for the internet PDN.

At step 305, the UE (100) sends the PDN connection for the emergency. At step 306, the MME entity (300) activates default EPS bearer for the emergency PDN. At step 307, the MME entity (300) deactivates internet EPS bearer. At step 308, the UE (100) moves to the idle mode. At step 309, it is not clear which IMSI may be used to calculate the paging occasions to monitor the paging message.

Figure 4:
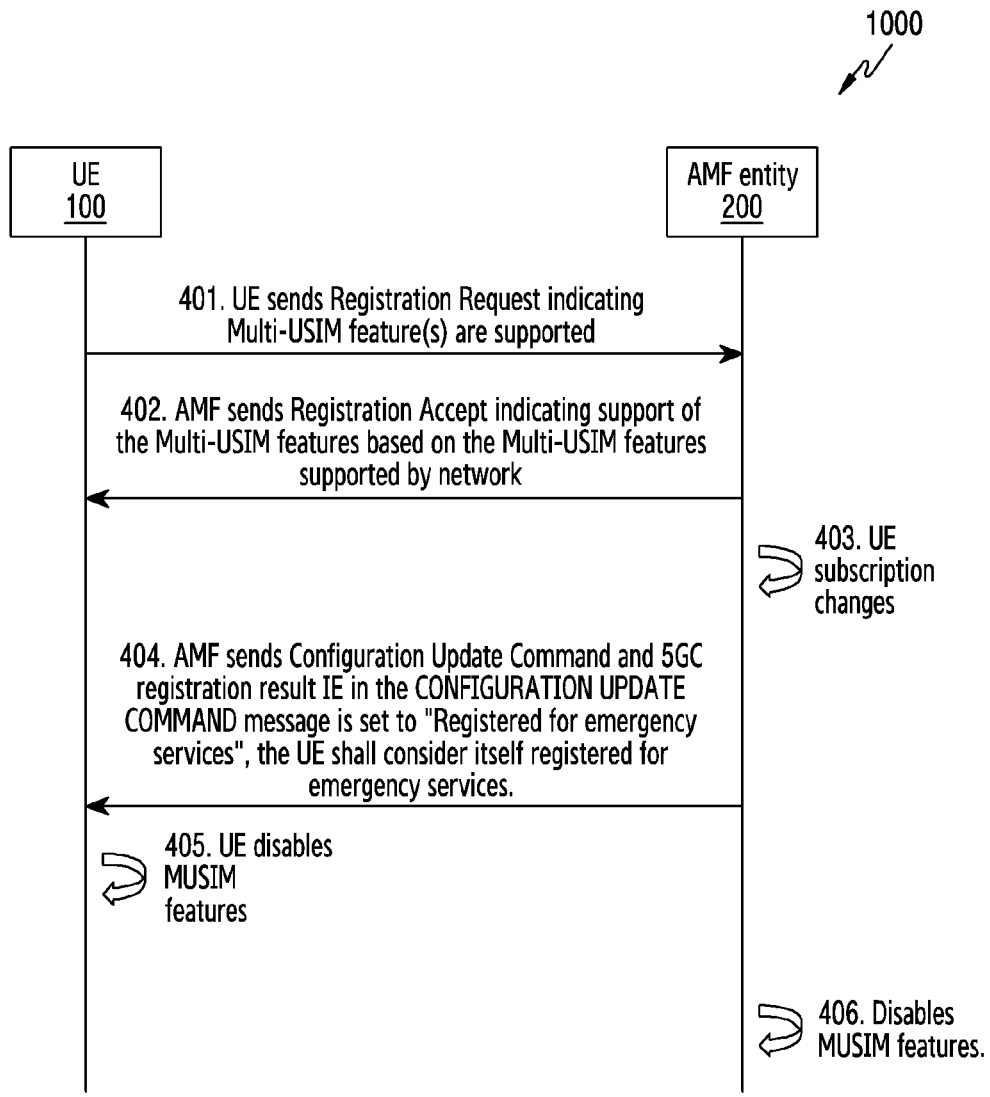
FIG. 4 illustrates a sequential flow for a scenario of the UE that disables MUSIM features according to an embodiment of the present disclosure.

FIG. 4 illustrates a sequential flow for a scenario of the UE (100) that disables the MUSIM features according to an embodiment.

Referring to FIG. 4, at step 401, the UE (100) sends the registration request indicating that the multi-USIM feature(s) are supported. At step 402, the AMF entity (200) sends the registration accept indicating support of the multi-USIM features based on the multi-USIM features supported by the network. At step 403, the UE (100) subscription changes or the UE (100) enters the forbidden area where the UE is not allowed to receive normal services.

At step 404, the AMF entity (200) sends configuration update command, disables MUSIM features for the UE (100) and set 5GS registration result IE in the CONFIGURATION UPDATE COMMAND message is set to "registered for emergency services," the UE may consider itself registered for emergency services. At step 405, the UE (100) disables MUSIM features due to reception of the NAS message in step 404

At step 406, the AMF entity (200) disables the MUSIM features. The AMF entity (200) disables the MUSIM features either when the configuration update command is sent (in step 404) or when the AMF entity (200) determines that generic UE configuration update procedure is successfully completed i.e., when the AMF entity (200) receives the CONFIGURATION UPDATE complete message.

In an embodiment, disable MUSIM features in this embodiment implies UE (100) and the network apparatus (e.g., AMF entity (200) or MME entity (300)) both (though explained in this embodiment only from the UE perspective) behaves as if the MUSIM features were negotiated as not supported during the last registration procedures. The AMF entity (200) stores in the UE context that the UE (100) does not support the MUSIM features. i.e., N1-NAS signalling connection release not supported, paging indication for voice services not supported, reject paging request not supported, paging restriction not supported. Due to this, the UE (100) may not request to release the NAS signalling connection or reject the paging message this may avoid impacts to the services which the network is intended to deliver to the UE (100).

In an embodiment, when a core network realizes that the UE (100) may be registered for the emergency services with the core network, a network function (NF) (for example, AMF entity (200) or MME entity (300)) sends a NAS message (for example UE configuration update command or the like) to indicate to the network that the MUSIM features are not supported i.e., N1-NAS signalling connection release not supported, paging indication for voice services not supported, reject paging request not supported, paging restriction not supported.

Figure 5:
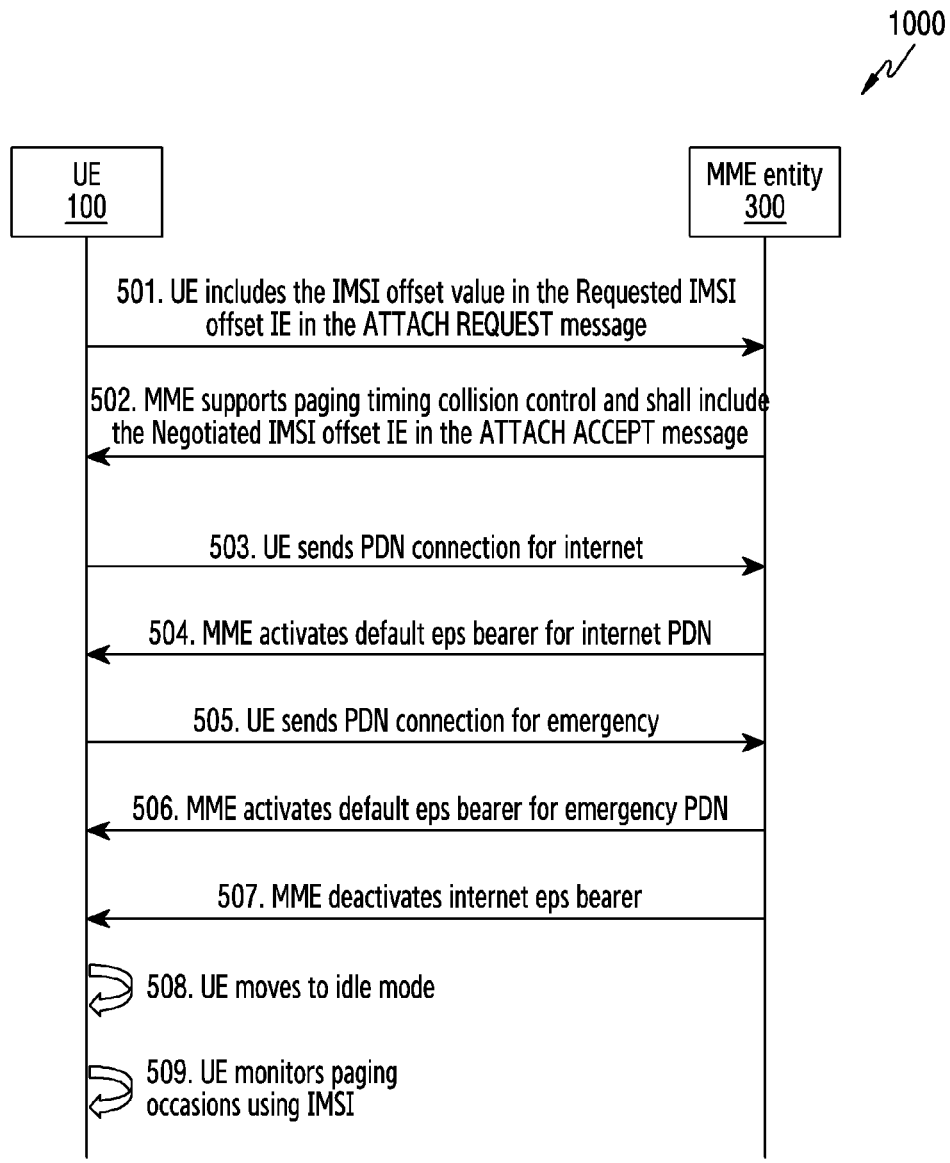
FIG. 5 illustrates a sequential flow for a scenario of using IMSI for paging occasion calculation while registered for the emergency service in an EPC according to an embodiment of the present disclosure.

FIG. 5 illustrates a sequential flow for a scenario of using IMSI for paging occasion calculation while registered for the emergency service in the EPC according to an embodiment of the present disclosure.

Referring to the FIG. 5, At step 501, the UE (100) includes the IMSI offset value in the requested IMSI offset IE in the ATTACH REQUEST message. At step 502, the MME entity (300) supports paging timing collision control and may include the negotiated IMSI offset IE in the ATTACH ACCEPT message. At step 503, the UE (100) sends the PDN connection for internet.

At step 504, the MME entity (300) activates default EPS bearer for the internet PDN. At step 505, the UE (100) sends the PDN connection for emergency. At step 506, the MME entity (300) activates default EPS bearer for the emergency PDN. At step 507, the MME entity (300) deactivates the internet EPS bearer. At step 508, the UE (100) moves to the idle mode. At step 509, the UE (100) monitors paging occasions using IMSI.

Figure 6:
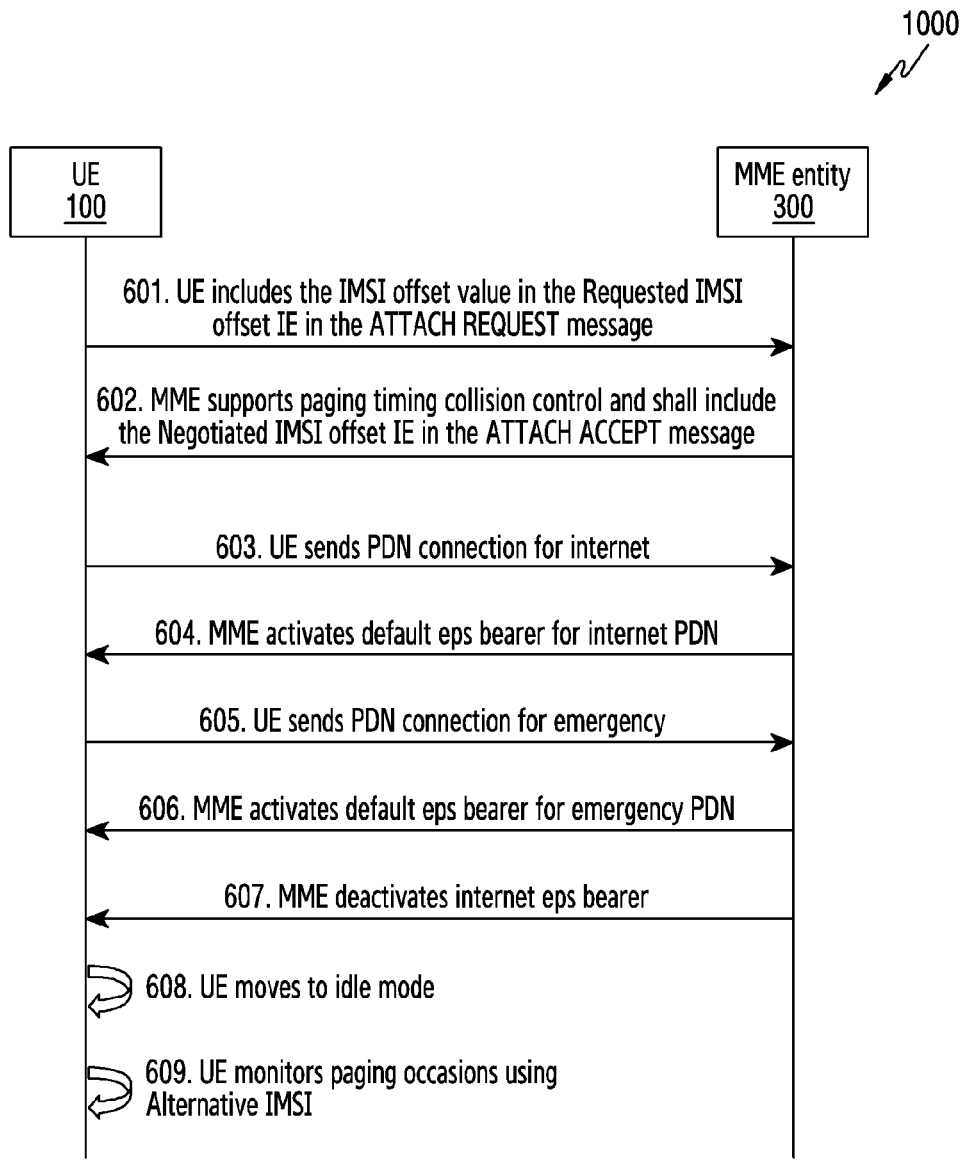
FIG. 6 illustrates a sequential flow for a scenario of alternative IMSI for paging occasion calculation while registered for the emergency service in EPC according to an embodiment of the present disclosure.

FIG. 6 illustrates a sequential flow for a scenario of alternative (also called as alternate) IMSI for paging occasion calculation while registered for the emergency service in EPC according to an embodiment of the present disclosure.

Referring to the FIG. 6, At step 601, the UE (100) includes the IMSI offset value in the requested IMSI offset IE in the ATTACH REQUEST message. At step 602, the MME entity (300) supports paging timing collision control and may include the negotiated IMSI offset IE in the ATTACH ACCEPT message. At step 603, the UE (100) sends PDN connection for the internet. At step 604, the MME entity (300) activates default EPS bearer for the internet PDN.

At step 605, the UE (100) sends PDN connection for the emergency. At step 606, the MME entity (300) activates default EPS bearer for the emergency PDN. At step 607, the MME entity (300) deactivates internet EPS bearer. At step 608, the UE (100) moves to the idle mode. At step 609, the UE (100) monitors paging occasions using the alternative IMSI.

Figure 7:
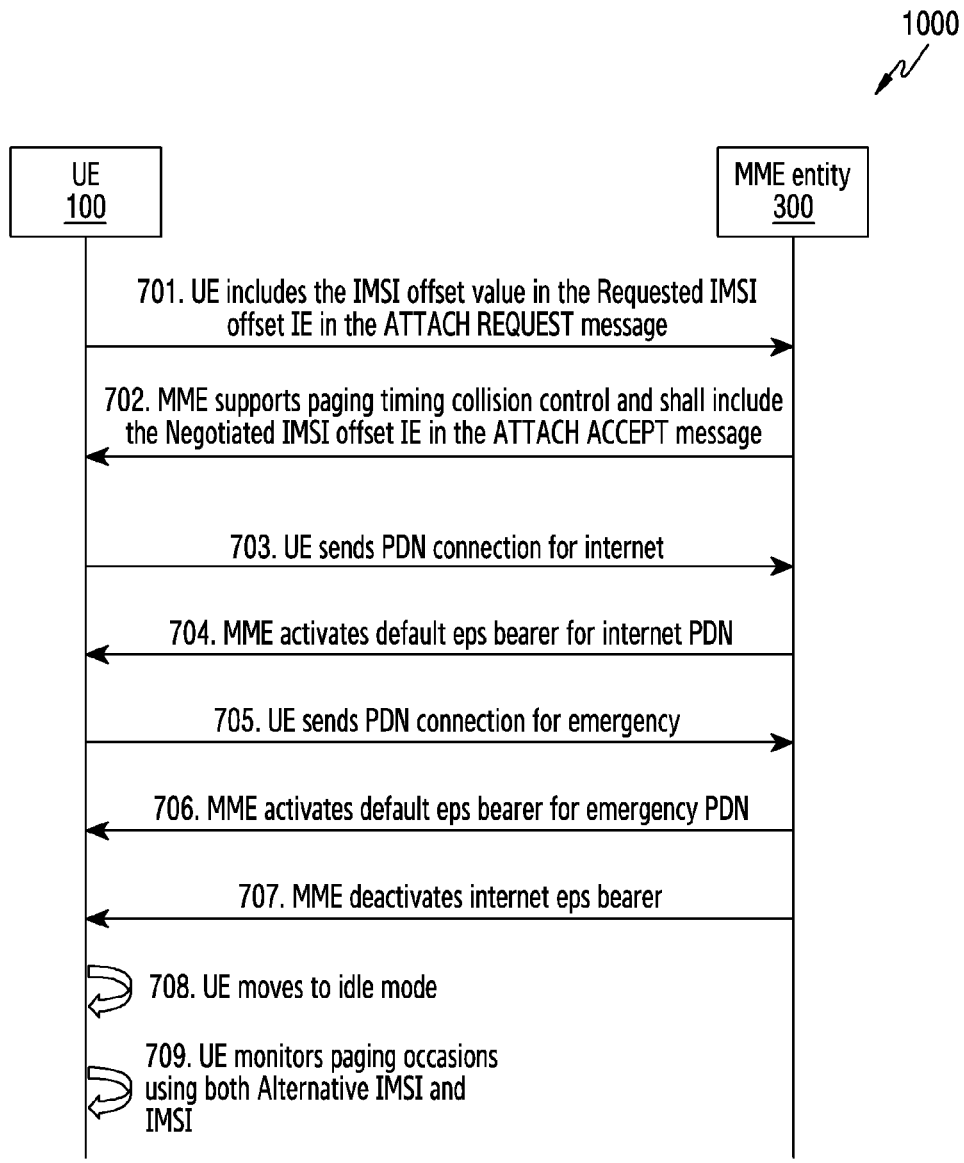
FIG. 7 illustrates a sequential flow for a scenario of IMSI and IMSI for paging occasion calculation while registered for emergency service in EPC according to an embodiment of the present disclosure.

FIG. 7 illustrates a sequential flow for a scenario of IMSI and IMSI for paging occasion calculation while registered for the emergency service in the EPC according to an embodiment of the present disclosure.

Referring to the FIG. 7, At step 701, the UE (100) includes the IMSI offset value in the requested IMSI offset IE in the ATTACH REQUEST message. At step 702, the MME entity (300) supports paging timing collision control and may include the negotiated IMSI offset IE in the ATTACH ACCEPT message. At step 703, the UE (100) sends PDN connection for internet. At step 704, the MME entity (300) activates default EPS bearer for internet PDN.

At step 705, the UE (100) sends PDN connection for the emergency. At step 706, the MME entity (300) activates default EPS bearer for emergency PDN. At step 707, the MME entity (300) deactivates internet EPS bearer. At step 708, the UE (100) moves to the idle mode. At step 709, the UE (100) monitors paging occasions using both Alternative IMSI and In an embodiment, the MME entity (300) can inform the UE (100) in a non-access stratum (NAS) message like a registration accept, a UE configuration update command or like so that the UE (100) may use IMSI value or Alternative IMSI value whenever the UE (100) registers for emergency services. i.e., core network (either MME entity (300) or AMF entity (200)) informs the UE (100) that the UE may monitor paging occasions (PO) derived using alternative IMSI value or derived using the IMSI value whenever the UE (100) is registered for emergency services.

In an embodiment, the UE (100) monitors paging occasions (PO) using alternative IMSI is as below or any other formula to calculate the alternate IMSI using IMS offset negotiated between the UE (100) and the core network.

Alternatively, IMSI=(IMSI+Accepted IMSI Offset) in 3GPP standard specification 36.304. If an accepted IMSI Offset is forwarded by upper layers, a UE AS may use the IMSI Offset value and IMSI to calculate an alternative IMSI value as IMSI+accepted IMSI offset. Here alternative IMSI value (instead of IMSI) is used to derive UE_ID in PO/PF calculation as defined in 3GPP standard specification 36.304 (see below).

In an embodiment, the UE (100) monitors PO using IMSI means IMSI value is used to derive UE_ID in PO/PF calculation as defined in 3GPP standard specification 36.304 (see below).

The UE (100) may use discontinuous reception (DRX) in the idle mode in order to reduce power consumption. One paging occasion (PO) is a subframe where there may be P-RNTI transmitted on PDCCH or MTC physical downlink control channel (MPDCCH) or, for NB-IoT on NPDCCH addressing the paging message. In P-RNTI transmitted on MPDCCH case, PO refers to the starting subframe of MPDCCH repetitions. In case of P-RNTI transmitted on NPDCCH, PO refers to the starting subframe of NPDCCH repetitions unless subframe determined by PO is not a valid NB-IoT downlink subframe then the first valid NB-IoT downlink subframe after PO is the starting subframe of the NPDCCH repetitions.

The paging message is same for both RAN initiated paging and CN initiated paging. The UE (100) initiates an RRC connection resume procedure upon receiving RAN paging. If the UE (100) receives a CN initiated paging in RRC_INACTIVE state, the UE (100) moves to RRC IDLE and informs NAS. One paging frame (PF) is one radio frame, which may contain one or multiple paging occasion(s). When DRX is used the UE (100) needs only to monitor one PO per DRX cycle. One paging narrowband (PNB) is one narrowband, on which the UE (100) performs the paging message reception.

PF, PO, and PNB are determined by following formulae.PF is given by following equation:

$$\text{SFN mod } T = (T \text{ div } N) * (\text{UE\_ID mod } N).$$

Index i_s pointing to PO from subframe pattern defined in 7.2 may be derived from following calculation:

$$i\_s = \text{floor}(\text{UE\_ID}/N) \text{ mod } Ns.$$

If P-RNTI is monitored on MPDCCH, the PNB is determined by the following equation:

$$\text{PNB} = \text{floor } (\text{UE\_ID}/(N*Ns)) \text{ mod } Nn.$$

If P-RNTI is monitored on NPDCCH and the UE (100) supports paging on a non-anchor carrier, and if paging configuration for non-anchor carrier is provided in system information, then the paging carrier is determined by the paging carrier with smallest index n ($0 \le n \le Nn-1$) fulfilling the following equation:

$$\text{floor}(\text{UE\_ID}/(N*Ns)) \text{ mod } W < W(0) + W(1) + \ldots + W(n).$$

System information DRX parameters stored in the UE (100) may be updated locally in the UE (100) whenever the DRX parameter values are changed in SI. If the UE (100) has no IMSI, for instance when making an emergency call without USIM, the UE (100) may use as default identity UE_ID=0 in the PF, i_s, and PNB formulas above. If the UE (100) has no 5G-S-TMSI, for instance when the UE has not yet registered onto the network, the UE (100) may use as default identity UE_ID=0 in the PF and i_s formulas above.

The following parameters are used for the calculation of the PF, i_s, PNB, wg, and the NB-IoT paging carrier:

T: DRX cycle of the UE.

In RRC IDLE state:

Except for NB-IoT: If a UE (100) specific extended DRX value of 512 radio frames is configured by upper layers according to 7.3, T=512. Otherwise, T is determined by the shortest of the UE specific DRX value, if allocated by upper layers, and a default DRX value broadcast in system information. If UE specific DRX is not configured by upper layers, the default value is applied.

In RRC_INACTIVE state, if extended DRX is not configured by upper layers as defined in 7.3:

T is determined by the shortest of the RAN paging cycle, if configured, the UE specific paging cycle, if allocated by upper layers, and the default paging cycle.

In RRC_INACTIVE state if extended DRX is configured by upper layers according to 7.3:

If a UE specific extended DRX value of 512 radio frames is configured, T is determined by the shortest of the RAN paging cycle, if configured, and 512 radio frames.

If a UE specific extended DRX value other than 512 radio frames is configured:

During the PTW, T is determined by the shortest of the RAN paging cycle, if configured, the UE specific paging cycle, if allocated by upper layers, and the default paging cycle. Outside the PTW, T is determined by the RAN paging cycle, if configured.

In an RRC_INACTIVE state, a BL UE or a UE in enhanced coverage uses the T value applicable for RRC IDLE state for the determination of PNB and i_s.

For NB-IoT: if a UE specific DRX value is allocated by upper layers and a minimum UE specific DRX value is broadcast in system information, T=min (default DRX value, max (UE specific DRX value, minimum UE specific DRX value broadcast in system information)). If UE specific DRX is not configured by upper layers or if the minimum UE specific DRX value is not broadcast in system information, the default DRX value is applied:

nB: 4T, 2T, T, T/2, T/4, T/8, T/16, T/32, T/64, T/128, and T/256, and for NB-IoT also T/512, and T/1024;

N: min(T, nB);

Ns: max(1, nB/T); and

Nn: number of paging narrow bands (for P-RNTI monitored on MPDCCH) or paging carriers (for P-RNTI monitored on NPDCCH) determined as follows:

If the UE (100) monitors GWUS according to clause 7.5.1:

this is the number of paging narrow bands (paging carriers) that are configured with GWUS.

else:

this is the number of paging narrow bands (paging carriers) provided in system information.

UE_ID:

If the UE (100) supports E-UTRA connected to 5GC and NAS indicated to use 5GC for the selected cell:

5G-S-TMSI mod 1024, if P-RNTI is monitored on PDCCH.

5G-S-TMSI mod 16384, if P-RNTI is monitored on NPDCCH or MPDCCH.

else

IMSI mod 1024, if P-RNTI is monitored on PDCCH.

IMSI mod 4096, if P-RNTI is monitored on NPDCCH.

IMSI mod 16384, if P-RNTI is monitored on MPDCCH or if P-RNTI is monitored on NPDCCH and the UE (100) supports paging on a non-anchor carrier, and if paging configuration for non-anchor carrier is provided in system information.

W(i): Weight for NB-IoT paging carrier i.

W: Total weight of all NB-IoT paging carriers, i.e., W=W(0)+W(1)++W(Nn−1). If UE (100) monitors GWUS according to clause 7.5.1, Total weight of all NB-IoT paging carriers configured with GWUS.

IMSI is given as sequence of digits of type Integer (0 . . . 9), IMSI may in the formulae above be interpreted as a decimal integer number, where the first digit given in the sequence represents the highest order digit.

For example:

$$\text{IMSI}=12 \text{ (digit1}=1,\text{digit2}=2).$$

In the calculations, this may be interpreted as the decimal integer "12," not "1×16+2=18."

5G-S-TMSI is a 48 bit long bit string as defined in 3GPP standard specification TS 23.501[39]. 5G-S-TMSI may in the PF and i_s formulae above be interpreted as a binary number where the left most bit represents the most significant bit.

Figure 8:
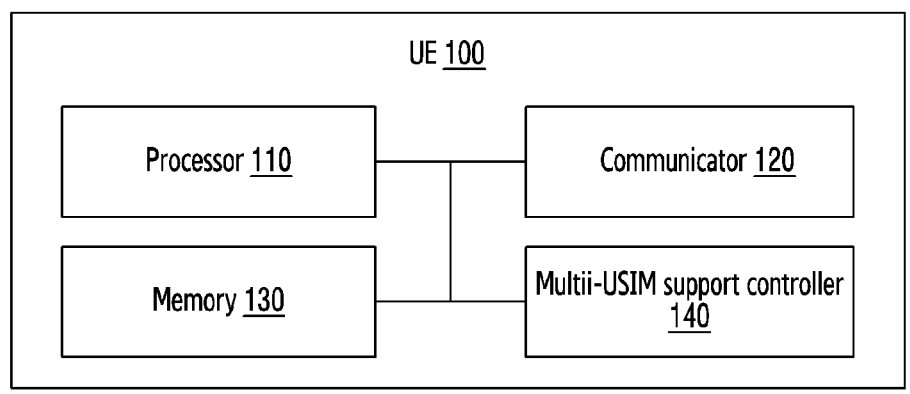
FIG. 8 illustrates hardware components of the UE according to an embodiment of the present disclosure.

FIG. 8 illustrates hardware components of the UE (100) according to an embodiment of the present disclosure. In an embodiment, the UE (100) includes a processor (110), a communicator (120), a memory (130) and a multi-USIM support controller (140). The processor (110) is coupled with the communicator (120), the memory (130) and the multi-USIM support controller (140).

The multi-USIM support controller (140) sends the registration request message to a network apparatus (400) (e.g., AMF entity (200) or the like) indicating support for the multi-USIM feature by the UE (100). The multi-USIM feature includes at least one of the N1 NAS signalling connection release, the paging indication for the voice service, the reject paging request, the paging restriction and the paging timing collision control. Further, the multi-USIM support controller (140) receives the registration accept message from the network apparatus (400) indicating support of the multi-USIM feature based on the multi-USIM feature supported by the network apparatus (400). Further, the multi-USIM support controller (140) receives the configuration update command message with the wireless system registration result IE indicating "registered for emergency services."

Further, the multi-USIM support controller (140) disables the multi-USIM feature. In an embodiment, the Further, the multi-USIM support controller (140) disables the multi-USIM feature by considering the network apparatus (400) did not indicate support for any MUSIM feature in the last registration procedure (i.e., registration accept message).

The multi-USIM support controller (140) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in random access memory (RAM) or cache).

Although the FIG. 8 illustrates hardware components of the UE (100) but it is to be understood that other embodiments are not limited thereon. In an embodiments, the UE (100) may include less or more number of components. Further, the labels or names of the components are used only for illustrative purpose and does not limit the scope of the present disclosure. One or more components can be combined together to perform same or substantially similar function in the UE (100).

Figure 9:
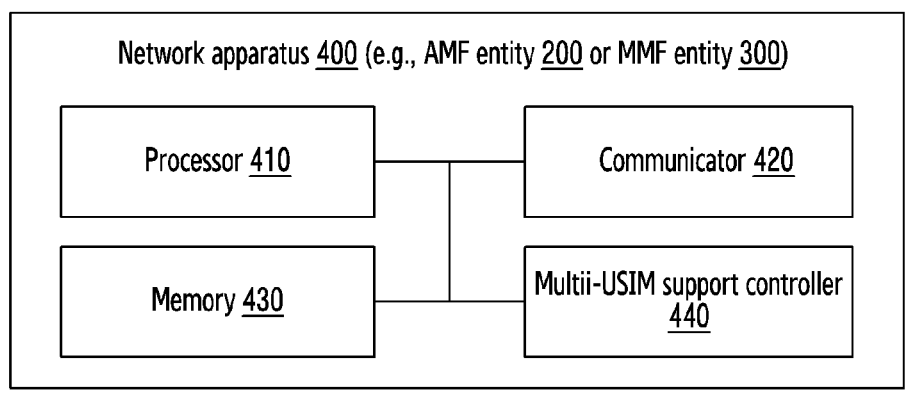
FIG. 9 illustrates hardware components of a network apparatus according to an embodiment of the present disclosure.

FIG. 9 illustrates hardware components of the network apparatus (400) according to an embodiment. The network apparatus (400) can be, for example, but not limited to the AMF entity (200) and the MME entity (300). In an embodiment, the network apparatus (400) includes a processor (410), a communicator (420), a memory (430) and a multi-USIM support controller (440). The processor (410) is coupled with the communicator (420), the memory (430) and the multi-USIM support controller (440).

The multi-USIM support controller (440) receives the registration request message indicating support for the multi-USIM feature by the UE (100). Further, the multi-USIM support controller (440) sends the registration accept message to the UE (100) indicating support of the multi-USIM feature based on the multi-USIM feature supported by the network apparatus (400). Further, the multi-USIM support controller (440) sends the configuration update command message to the UE (100) with a wireless system registration result information element (IE) indicating "registered for emergency services." Further, the multi-USIM support controller (440) disables the multi-USIM feature at the network apparatus (400). In an embodiment, the multi-USIM support controller (440) disables the multi-USIM feature by considering the network apparatus (400) did not indicate support for any MUSIM feature in the last registration procedure.

Further, multi-USIM support controller (440) sends the configuration update command message with the 5GS registration result IE indicating "registered for emergency services" when the network apparatus (400) deems that the UE (100) does not receive a normal service and receives the emergency service due to change in a subscription of the UE (100) or due to the UE (100) being in a forbidden area.

The multi-USIM support controller (440) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (410) is configured to execute instructions stored in the memory (430) and to perform various processes. The communicator (420) is configured for communicating internally between internal hardware components and with external devices via one or more networks. The memory (430) also stores instructions to be executed by the processor (410). The memory (430) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (430) may, in some examples, be considered a non-transitory storage medium. The term "non-transitory" may indicate that the storage medium is not embodied in a carrier wave or a propagated signal. However, the term "non-transitory" should not be interpreted that the memory (430) is non-movable. In certain examples, a non-transitory storage medium may store data that can, over time, change (e.g., in random access memory (RAM) or cache).

Although the FIG. 9 illustrates hardware components of the network apparatus (400) but it is to be understood that other embodiments are not limited thereon. In other embodiments, the network apparatus (400) may include less or more number of components. Further, the labels or names of the components are used only for illustrative purpose and does not limit the scope of the present disclosure. One or more components can be combined together to perform same or substantially similar function in the network apparatus (400).

Figure 10:
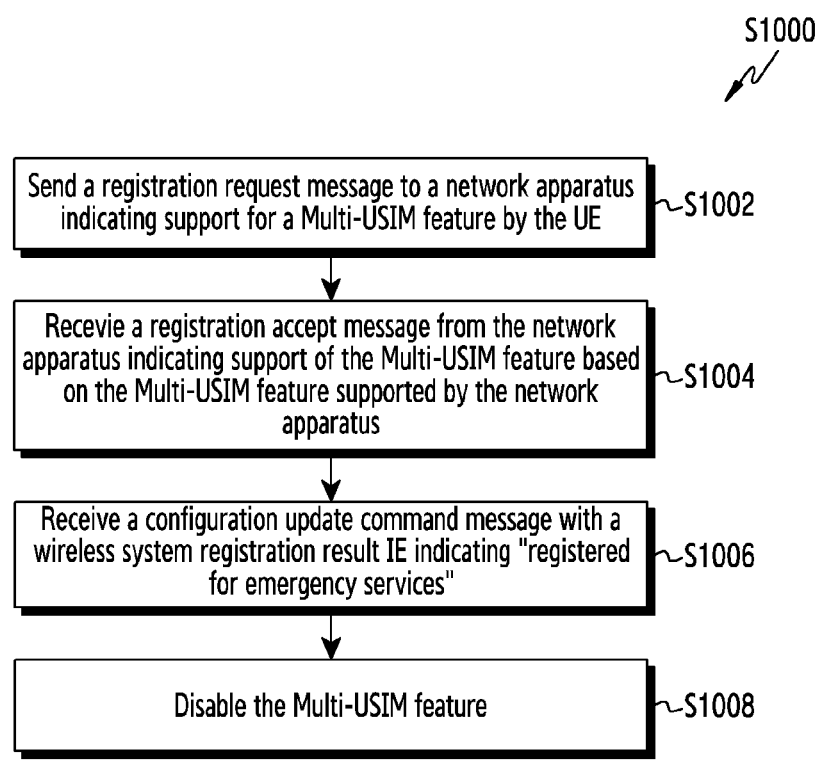
FIG. 10 illustrates a flow chart of a method, implemented by the UE, to switch multi-USIM feature in the wireless network according to an embodiment of the present disclosure.

FIG. 10 illustrates a flow chart (S1000) of a method, implemented by the UE (100), to switch multi-USIM feature in the wireless network (1000), according to the embodiments of the present disclosure as disclosed herein. The operations (S1002-S1008) are handled by the multi-USIM support controller (140).

At S1002, the method includes sending the registration request message to the network apparatus (400) indicating support for the multi-USIM feature by the UE (100). At S1004, the method includes receiving the registration accept message from the network apparatus (400) indicating support of the multi-USIM feature based on the multi-USIM feature supported by the network apparatus (400). At S1006, the method includes receiving the configuration update command message with the wireless system registration result information element (IE) indicating "registered for emergency services." At S1008, the method includes disabling the multi-USIM feature.

Figure 11:
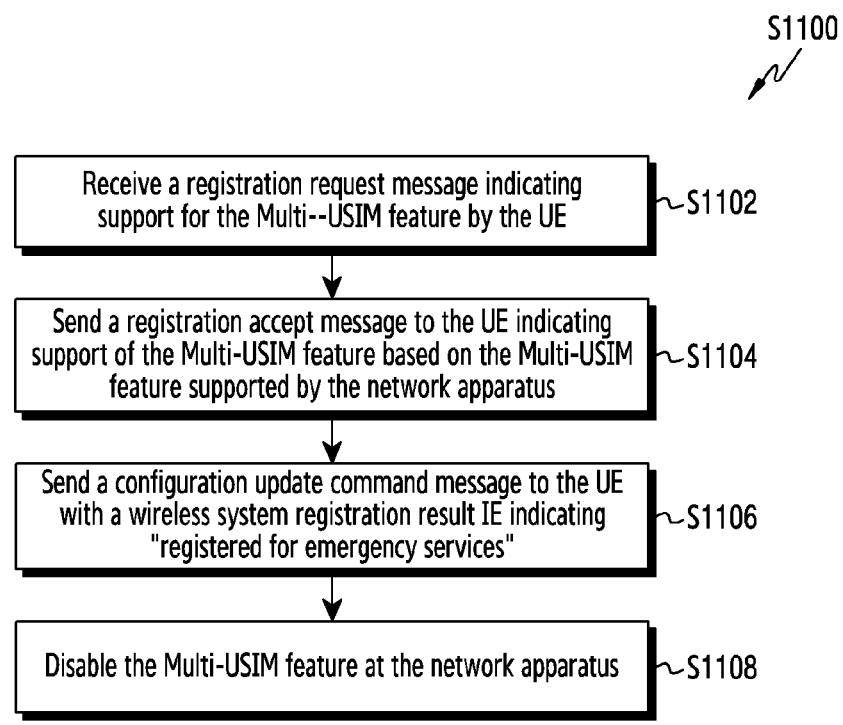
FIG. 11 illustrates a flow chart of a method, implemented by the network apparatus, to switch multi-USIM feature in the wireless network according to an embodiment of the present disclosure.

FIG. 11 illustrates a flow chart (S1100) illustrating a method, implemented by the network apparatus (400), to switch multi-USIM feature in the wireless network (1000) according to an embodiment of the present disclosure. The operations (S1102-S1108) are handled by the multi-USIM support controller (440).

At S1102, the method includes receiving the registration request message indicating support for the multi-USIM feature by the UE (100). At S1104, the method includes sending the registration accept message to the UE (100) indicating support of the multi-USIM feature based on the multi-USIM feature supported by the network apparatus (400). At S1106, the method includes sending the configuration update command message to the UE (100) with the wireless system registration result IE indicating "registered for emergency services." At S1108, the method includes disabling the multi-USIM feature at the network apparatus (400).

The various actions, acts, blocks, steps, or the like in the flow charts (S1000 and S1100) may be performed in the order presented, in a different order or simultaneously. Further, in some embodiments, some of the actions, acts, blocks, steps, or the like may be omitted, added, modified, skipped, or the like without departing from the scope of the present disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

Figure 12:
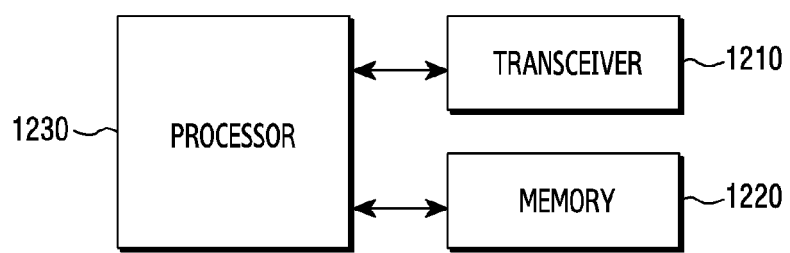
FIG. 12 illustrates a structure of a UE according to an embodiment of the present disclosure.

FIG. 12 illustrates a structure of a UE according to an embodiment of the present disclosure.

As shown in FIG. 12, the UE according to an embodiment may include a transceiver 1210, a memory 1220, and a processor 1230. The transceiver 1210, the memory 1220, and the processor 1230 of the UE may operate according to a communication method of the UE described above. However, the components of the UE are not limited thereto. For example, the UE may include more or fewer components than those described above. In addition, the processor 1230, the transceiver 1210, and the memory 1220 may be implemented as a single chip. Also, the processor 1230 may include at least one processor. Furthermore, the UE of FIG. 12 corresponds to the UE 100 of the FIG. 1.

The transceiver 1210 collectively refers to a UE receiver and a UE transmitter, and may transmit/receive a signal to/from a base station or a network entity. The signal transmitted or received to or from the base station or a network entity may include control information and data. The transceiver 1210 may include a RF transmitter for up-converting and amplifying a frequency of a transmitted signal, and a RF receiver for amplifying low-noise and down-converting a frequency of a received signal. However, this is only an example of the transceiver 1210 and components of the transceiver 1210 are not limited to the RF transmitter and the RF receiver.

Also, the transceiver 1210 may receive and output, to the processor 1230, a signal through a wireless channel, and transmit a signal output from the processor 1230 through the wireless channel.

The memory 1220 may store a program and data required for operations of the UE. Also, the memory 1220 may store control information or data included in a signal obtained by the UE. The memory 1220 may be a storage medium, such as read-only memory (ROM), random access memory (RAM), a hard disk, a CD-ROM, and a DVD, or a combination of storage media.

The processor 1230 may control a series of processes such that the UE operates as described above. For example, the transceiver 1210 may receive a data signal including a control signal transmitted by the base station or the network entity, and the processor 1230 may determine a result of receiving the control signal and the data signal transmitted by the base station or the network entity.

Figure 13:
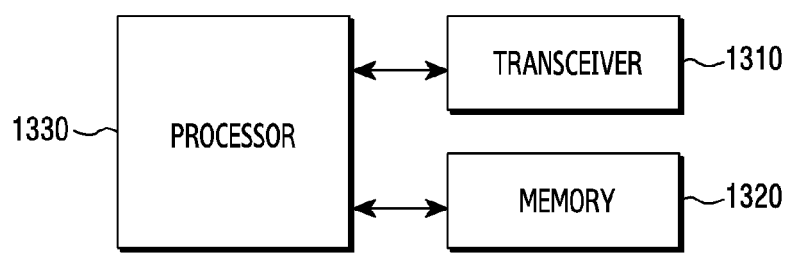
FIG. 13 illustrates a structure of a network entity according to an embodiment of the present disclosure.

FIG. 13 illustrates a structure of a network entity according to an embodiment of the present disclosure.

As shown in FIG. 13, the network entity of the present disclosure may include a transceiver 1310, a memory 1320, and a processor 1330. The transceiver 1310, the memory 1320, and the processor 1330 of the network entity may operate according to a communication method of the network entity described above. However, the components of the terminal are not limited thereto. For example, the network entity may include more or fewer components than those described above. In addition, the processor 1330, the transceiver 1310, and the memory 1320 may be implemented as a single chip. Also, the processor 1330 may include at least one processor.

For example, the network entity of FIG. 13 corresponds to the AMF 200 of the FIG. 1.

The transceiver 1310 collectively refers to a network entity receiver and a network entity transmitter, and may transmit/receive a signal to/from a base station or a UE. The signal transmitted or received to or from the base station or the UE may include control information and data. In this regard, the transceiver 1310 may include a RF transmitter for up-converting and amplifying a frequency of a transmitted signal, and a RF receiver for amplifying low-noise and down-converting a frequency of a received signal. However, this is only an example of the transceiver 1310 and components of the transceiver 1310 are not limited to the RF transmitter and the RF receiver.

Also, the transceiver 1310 may receive and output, to the processor 1330, a signal through a wireless channel, and transmit a signal output from the processor 1330 through the wireless channel.

The memory 1320 may store a program and data required for operations of the network entity. Also, the memory 1320 may store control information or data included in a signal obtained by the network entity. The memory 1320 may be a storage medium, such as ROM, RAM, a hard disk, a CD-ROM, and a DVD, or a combination of storage media.

The processor 1330 may control a series of processes such that the network entity operates as described above. For example, the transceiver 1310 may receive a data signal including a control signal, and the processor 1330 may determine a result of receiving the data signal.

According to an embodiment, a method to switch multi-USIM feature in a wireless network (1000) is provided. The method comprises sending, by a user equipment (UE) (100) to a network apparatus (400) in the wireless network (1000), a registration request message indicating support for the multi-USIM feature by the UE (100). The method comprises receiving, by the UE (100) from the network apparatus (400), a registration accept message indicating support of the multi-USIM feature based on the multi-USIM feature supported by the network apparatus (400), receiving, by the UE (100) from the network apparatus (400), a configuration update command message with a 5GS registration result information element (IE) indicating "registered for emergency services"; and disabling, by the UE (100), the multi-USIM feature.

The UE (100) disables the multi-USIM feature by considering the network apparatus (400) did not indicate support for any MUSIM feature in the registration accept message.

The multi-USIM feature comprises at least one of a N1 NAS signalling connection release, a paging indication for a voice service, a reject paging request, a paging restriction and a paging timing collision control, and wherein the network apparatus (400) is an AMF entity (200).

The network apparatus (400) sends a configuration update command message with a 5GS registration result information element (IE) indicating "registered for emergency services" when the network apparatus (400) deems that the UE (100) does not receive a normal service and receives the emergency service due to change in a subscription of the UE (100) or due to the UE (100) being in a forbidden area.

According to an embodiment, a method to switch multi-USIM feature in a wireless network (1000) is provided. The method comprises receiving, by a network apparatus (400) from a UE (100) in the wireless network (1000), a registration request message indicating support for the multi-USIM feature, sending, by the network apparatus (400) to the UE (100), a registration accept message indicating support of the multi-USIM feature based on the multi-USIM feature supported by the network apparatus (400). The method comprises sending, by the network apparatus (400) to the UE (100), a configuration update command message with a 5GS registration result information element (IE) indicating "registered for emergency services" and disabling, by the network apparatus (400), the multi-USIM feature.

The network apparatus (400) disables the multi-USIM feature by considering the network apparatus (400) did not indicate support for any MUSIM feature in the registration accept message.

The multi-USIM feature comprises at least one of a N1 NAS signalling connection release, a paging indication for a voice service, a reject paging request, a paging restriction and a paging timing collision control, and wherein the network apparatus (400) is an AMF entity (200).

The network apparatus (400) sends a configuration update command message with a 5GS registration result information element (IE) indicating "registered for emergency services" when the network network (400) deems that the UE (100) does not receive a normal service and receives the emergency service due to change in a subscription of the UE (100) or due to the UE (100) being in a forbidden area.

According to an embodiment, a user equipment (UE) (100) to switch multi-USIM feature in a wireless network (1000) is provided. The UE (100) comprises a memory (130), a processor (110), a multi-USIM support controller (140), communicatively coupled to the memory (130) and the processor (110). The processor is configured to send a registration request message to a network apparatus (400) in the wireless network (1000) indicating support for the multi-USIM feature by the UE (100), and receive a registration accept message from the network apparatus (400) indicating support of the multi-USIM feature based on the multi-USIM feature supported by the network apparatus (400). The processor is configured to receive a configuration update command message with a wireless system registration result information element (IE) indicating "registered for emergency services" and disable the multi-USIM feature.

The UE (100) disables the multi-USIM feature by considering the network apparatus (400) did not indicate support for any MUSIM feature in the registration accept message.

The multi-USIM feature comprises at least one of a N1 NAS signalling connection release, a paging indication for a voice service, a reject paging request, a paging restriction and a paging timing collision control, and wherein the network apparatus (400) is an AMF entity (200).

The network apparatus (400) sends a configuration update command message with a 5GS registration result information element (IE) indicating "registered for emergency services" when the network network (400) deems that the UE (100) does not receive a normal service and receives the emergency service due to change in a subscription of the UE (100) or due to the UE (100) being in a forbidden area.

According to an embodiment, a network apparatus (400) to switch multi-USIM feature in a wireless network (1000) is provided. The network apparatus (400) comprises a memory (430), a processor (410), a multi-USIM support controller (440), communicatively coupled to the memory (430) and the processor (410). The processor is configured to receive a registration request message indicating support for the multi-USIM feature by the UE (100), send a registration accept message to the UE (100) indicating support of the multi-USIM feature based on the multi-USIM feature supported by the network apparatus (400), send a configuration update command message to the UE (100) with a wireless system registration result information element (IE) indicating "registered for emergency services" and disable the multi-USIM feature at the network apparatus (400).

The network apparatus (400) disables the multi-USIM feature by considering the network apparatus (400) did not indicate support for any MUSIM feature in the registration accept message.

The multi-USIM feature comprises at least one of a N1 NAS signalling connection release, a paging indication for a voice service, a reject paging request, a paging restriction and a paging timing collision control, and the network apparatus (400) is an AMF entity (200).

The network apparatus (400) sends a configuration update command message with a 5GS registration result information element (IE) indicating "registered for emergency services" when the network network (400) deems that the UE (100) does not receive a normal service and receives the emergency service due to change in a subscription of the UE (100) or due to the UE (100) being in a forbidden area.

According to an embodiment, a method performed by a user equipment (UE) in a mobile communication system is provided. The method comprises receiving, from an access management function (AMF) entity via a base station, a configuration update command message in case that the UE supporting a multi universal subscriber identity module (MUSIM) feature is not registered for an emergency service, and disabling the MUSIM features based on the received configuration update command message. The configuration update command message includes registration result information indicating that the UE supporting the MUSIM features is registered for the emergency service.

The method further comprises transmitting, to the AMF entity via the base station, a registration request message for an initial registration, and receiving, from the AMF entity via the base station, a registration accept message as a response to the registration request message.

The registration request message comprises information indicating that the MUSIM features are supported by the UE, and the registration accept message comprises information indicating that the MUSIM features are supported by a network including the AMF entity.

The MUSIM features comprises at least one of a N1 non-access stratum (NAS) signalling connection release, a paging indication for voice services, a reject paging request, a paging restriction or a paging timing collision control.

The disabling of the MUSIM features comprises behaving as if a network including the AMF entity does not support the MUSIM features based on the received configuration update command message.

A user equipment (UE) in a mobile communication system is provided. The UE comprises a transceiver and a controller coupled with the transceiver and configured to receive, from an access management function (AMF) entity via a base station, a configuration update command message in case that the UE supporting a multi universal subscriber identity module (MUSIM) feature is not registered for an emergency service, and disable the MUSIM features based on the received configuration update command message. The configuration update command message includes registration result information indicating that the UE supporting the MUSIM features is registered for the emergency service.

The controller is further configured to transmit, to the AMF entity via the base station, a registration request message for an initial registration, and receive, from the AMF entity via the base station, a registration accept message as a response to the registration request message.

The registration request message comprises information indicating that the MUSIM features are supported by the UE, and the registration accept message comprises information indicating that the MUSIM features are supported by a network including the AMF entity.

The MUSIM features comprises at least one of a N1 non-access stratum (NAS) signalling connection release, a paging indication for voice services, a reject paging request, a paging restriction or a paging timing collision control.

The controller is further configured to behave as if a network including the AMF entity does not support the MUSIM features based on the received configuration update command message.

According to an embodiment, a method performed by an access management function (AMF) entity in a mobile communication system is provided. The method comprises transmitting, to a user equipment (UE) via a base station, a configuration update command message in case that the UE supporting a multi universal subscriber identity module (MUSIM) features is not registered for an emergency service, and disabling the MUSIM features based on the configuration update command message being transmitted to the UE. The configuration update command message includes registration result information indicating that the UE supporting the MUSIM features is registered for the emergency service.

The method further comprises receiving, from the UE via the base station, a registration request message for an initial registration, and transmitting, to the UE via the base station, a registration accept message as a response to the registration request message.

The registration request message comprises information indicating that the MUSIM features are supported by the UE, and the registration accept message comprises information indicating that the MUSIM features are supported by a network including the AMF entity.

The MUSIM features comprises at least one of a N1 non-access stratum (NAS) signalling connection release, a paging indication for voice services, a reject paging request, a paging restriction or a paging timing collision control.

The disabling of the MUSIM features comprises behaving as if a network including the AMF entity does not support the MUSIM features based on the configuration update command message being transmitted to the UE.

According to an embodiment, an access management function (AMF) entity in a mobile communication system is provided. The AMF entity comprises a transceiver and a controller coupled with the transceiver and configured to transmit, to a user equipment (UE) via a base station, a configuration update command message in case that the UE supporting a multi universal subscriber identity module (MUSIM) features is not registered for an emergency service, and disable the MUSIM features based on the configuration update command message being transmitted to the UE. The configuration update command message includes registration result information indicating that the UE supporting the MUSIM features is registered for the emergency service.

The controller is further configured to receive, from the UE via the base station, a registration request message for an initial registration, and transmit, to the UE via the base station, a registration accept message as a response to the registration request message.

The registration request message comprises information indicating that the MUSIM features are supported by the UE, and the registration accept message comprises information indicating that the MUSIM features are supported by a network including the AMF entity.

The MUSIM features comprises at least one of a N1 non-access stratum (NAS) signalling connection release, a paging indication for voice services, a reject paging request, a paging restriction or a paging timing collision control.

The controller is further configured to behave as if a network including the AMF entity does not support the MUSIM features based on the configuration update command message being transmitted to the UE.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a mobile communication system, the method comprising:
   transmitting, to an access and mobility management function (AMF) entity via a base station, a registration request message for a registration procedure, wherein the UE supports multi universal subscriber identity module (MUSIM) features;
   receiving, from the AMF entity via the base station, a registration accept message comprising information indicating support for the MUSIM features;
   receiving, from the AMF entity via the base station, a configuration update command message, wherein the configuration update command message comprises registration result information that is set that the UE is registered for an emergency service; and operating as if the support for the MUSIM features is not indicated in the registration procedure, based on the registration result information.

2. The method of claim 1, wherein the registration request message comprises information indicating support of the UE for the MUSIM features.

3. The method of claim 1, wherein the MUSIM features comprise at least one of a N1 non-access stratum (NAS) signalling connection release, a paging indication for voice services, a reject paging request, or a paging restriction.

4. A user equipment (UE) in a mobile communication system, the UE comprising:
   a transceiver; and
   a controller coupled with the transceiver and configured to:
      transmit, to an access and mobility management function (AMF) entity via a base station, a registration request message for a registration procedure, wherein the UE supports multi universal subscriber identity module (MUSIM) features,
      receive, from the AMF entity via the base station, a registration accept message comprising information indicating support for the MUSIM features,
      receive, from the AMF entity via the base station, a configuration update command message, wherein the configuration update command message comprises registration result information that is set that the UE is registered for an emergency service, and
      operate as if the support for the MUSIM features is not indicated in the registration procedure, based on the registration result information.

5. The UE of claim 4, wherein the registration request message comprises information indicating support of the UE for the MUSIM features.

6. The UE of claim 4, wherein the MUSIM features comprise at least one of a N1 non-access stratum (NAS) signalling connection release, a paging indication for voice services, a reject paging request, or a paging restriction.

7. A method performed by an access and mobility management function (AMF) entity in a mobile communication system, the method comprising:
   receiving, from a user equipment (UE) associated with multi universal subscriber identity module (MUSIM) features via a base station, a registration request message for a registration procedure;
   transmitting, to the UE via the base station, a registration accept message comprising information indicating support for the MUSIM features;
   transmitting, to the UE via the base station, a configuration update command message, wherein the configuration update command message comprises registration result information that is set that the UE is registered for an emergency service; and
   operating as if the support for the MUSIM features is not indicated in the registration procedure, based on the registration result information.

8. The method of claim 7, wherein the registration request message comprises information indicating support of the UE for the MUSIM features.

9. The method of claim 7, wherein the MUSIM features comprise at least one of a N1 non-access stratum (NAS) signalling connection release, a paging indication for voice services, a reject paging request, or a paging restriction.

10. An access and mobility management function (AMF) entity in a mobile communication system, the AMF entity comprising:
    a transceiver; and
    a controller coupled with the transceiver and configured to:
       receive, from a user equipment (UE) associated with multi universal subscriber identity module (MUSIM) features via a base station, a registration request message for a registration procedure,
       transmit, to the UE via the base station, a registration accept message comprising information indicating support for the MUSIM features,
       transmit, to the UE via the base station, a configuration update command message, wherein the configuration update command message comprises registration result information that is set that the UE is registered for an emergency service, and
       operate as if the support for the MUSIM features is not indicated in the registration procedure, based on the registration result information.

11. The AMF entity of claim 10, wherein the registration request message comprises information indicating support of the UE for the MUSIM features.

12. The AMF entity of claim 10, wherein the MUSIM features comprise at least one of a N1 non-access stratum (NAS) signalling connection release, a paging indication for voice services, a reject paging request, or a paging restriction.

* * * * *